Feb. 25, 1958

R. A. HILBERT 2,824,418

ANIMATED TIMING DEVICE

Filed Oct. 14, 1955

INVENTOR
ROBERT ARTHUR HILBERT.
BY
Churchill, Rich, Waymouth & Engel
ATTORNEYS.

United States Patent Office 2,824,418
Patented Feb. 25, 1958

2,824,418

ANIMATED TIMING DEVICE

Robert Arthur Hilbert, Huntington, N. Y.

Application October 14, 1955, Serial No. 540,564

10 Claims. (Cl. 58—1)

This invention relates to timers of the hourglass type and aims to provide certain improvements therein.

An object of the invention is to provide a timer of the hourglass type wherein the fluent material contained therein flows from the opposite ends of an arcuate chamber into a reversely positioned like chamber.

A further object of the invention is to provide, in combination with a timer of the hourglass type, a fixable member having a surface representation of an animated object whereby the change in the quantity of fluent material in flowing from one chamber of the hourglass to the other will produce a readily recognizable change in the visual appearance of the surface representation of the device in a measured period of time.

A more specific object of the invention is to provide a timing device as set forth in the preceding paragraph which will appeal to children and serve as an aid and incentive toward furthering certain salutary habits, such, for example, better dental hygiene habits, by promoting brushing of the teeth for a beneficial period of time.

The foregoing and other objects of the invention not specifically enumerated, the novel combinations of parts and the novel results attained thereby will be apparent from the detailed description which follows, when considered in connection with the accompanying drawing, in which.

Figure 1:
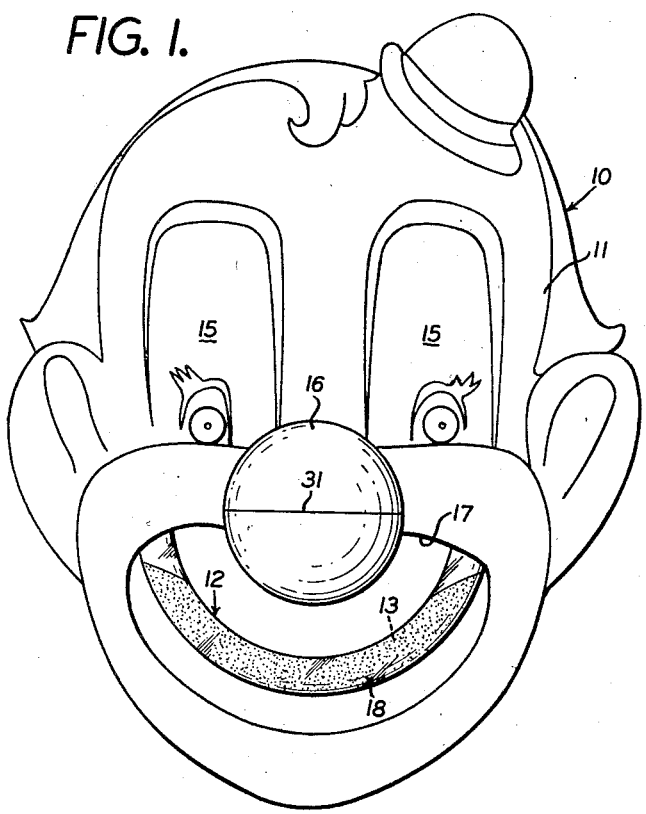
Figure 1 shows a front elevational view of a timer embodying the invention.
Figure 2:
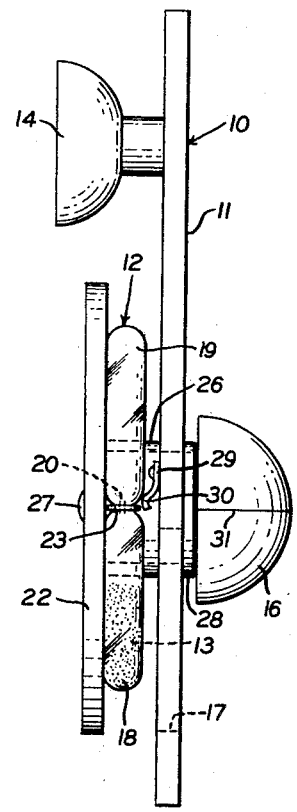
Fig. 2 is a side elevational view of the device shown in Figure 1 as viewed from the left thereof.
Figure 3:
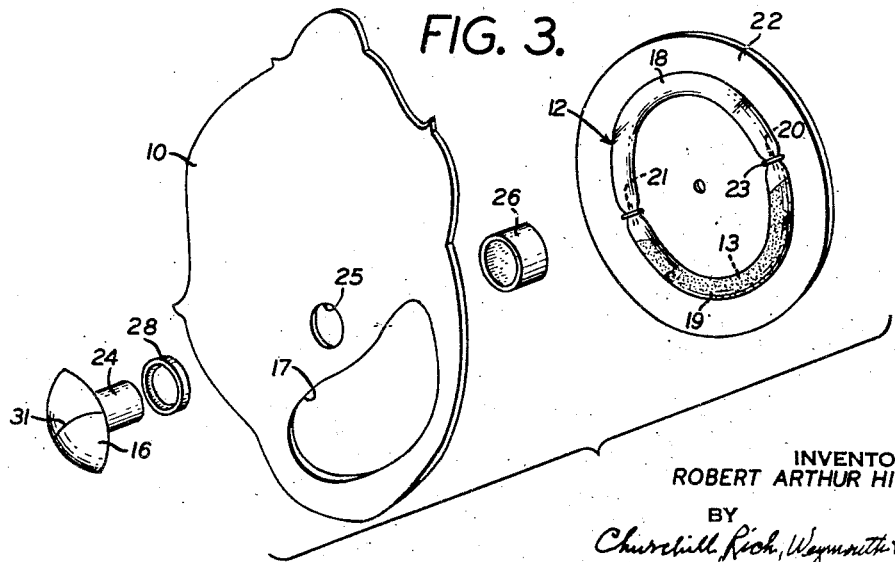
Fig. 3 shows an exploded view of the component parts of the device.

Referring to the drawing, the timing device may be said to consist of a fixable member 10 having a surface representation of an animated object 11, and an hourglass 12 containing fluent material 13 mounted rearwardly on the fixable member for rotation relative to the fixable member to selectively position either of the hourglass chambers above the other.

The fixable member 10 may have any desired form and is provided with a suction cup 14 or other equivalent means for mounting the device on a wall. The surface representation of the animated object may likewise be of any desired character, herein shown as the face of a clown having vertically elongated eyes 15, a bulbous nose 16 projecting forwardly from the fixable member and a wide open mouth 17 through which at least one chamber of the hourglass is visible.

The hourglass member 11 as herein shown, consists of a hollow receptacle formed of two like chambers 18 and 19 of substantially equal volume adapted to be brought selectively into overlying relation one to the other, each chamber having spaced apart ends, with the respective ends of the chambers in juxtaposition and connected together by restricted passageways 20 and 21 through which the fluent material may pass from one chamber to the other when one chamber is disposed in overlying relation to the other and the passageways are disposed in a substantially horizontal line. Each of the chambers 18 and 19 is preferably substantially semi-annular in shape and forms with the restricted passageways 20 and 21 a closed path or annulus.

The hourglass 12 as herein shown is mounted on a flat disc 22 to which it is secured by fasteners or clips 23 engaging over the portions of the hourglass formed with the restricted passageways. Any suitable means may be employed for rotatively mounting the hourglass in relation to the fixable member. As herein shown, the bulbous nose 16 is relied upon as the means for rotating the hourglass and said nose is formed with a hub portion 24 which extends through an opening 25 in the fixable member and through a guide sleeve spacer 26 rearwardly of the fixable member, the parts 16, 10, 26 and 22 being adapted to be held together in assembled relation by a screw 27 extending through the rear face of the disc 22 and engaging the hub portion 24. If desired, the inner face of the bulbous nose 16 may be spaced from the front face of the fixable member by a washer 28. To hold the hourglass selectively in position with one of the chambers in overlying relation to the other while still permitting such selective positioning, there is mounted on the rear face of the fixable member a pair of leaf springs 29 having a hump portion 30 adapted to engage within the recess formed between the ends of the hourglass chambers 18 and 19 by the restricted passageways 20, 21. If desired, a line 31 may extend across the nose 16 to serve as an index or tell-tale showing the relationship of the glass chambers, one to the other.

The device as hereinbefore described is intended as a timer for use by children in brushing their teeth and is dependent upon the time required for the fluent material, which may be sand or colored liquid, to pass from one chamber of the hourglass to the other. To start the flow of the fluent material, the nose 16 is grasped and rotated 180°. The time interval, say three minutes, will be effectively portrayed to the child by the change in the visual appearance of the surface representation on the fixable member, brought about by the progressive filling of the lower chamber of the hourglass with the colored fluent material, which being visible through the open mouth of the clown will create the effect of a broad smile on the face of the clown, depicting satisfaction with the completion of a task well done. Of course, the visual representation and the relationship of the fluent material in one of the chambers to such representation should be such that the relationship will be visibly changed at the completion of flow of the fluent material from or into such chamber. Preferably, of course, one of the hourglass chambers should be obscured or hidden from view by the surface ornamentation.

It will be appreciated that the various parts of the device will be formed of suitable material to produce the desired visual effects and although I have shown but a single application of the concept underlying my invention, it will be readily appreciated that its application may take manifold forms, hence, the scope of my invention is to be construed in the light of the appended claims.

What I claim is:

1. A timer of the hourglass type comprising a hollow receptacle formed of two like chambers of substantially equal volume, means for adjustably mounting the receptacle to selectively position the two chambers in overlying relation one to the other, each chamber having spaced apart ends, with the respective ends in juxtaposition, a restricted passageway at each end connecting the chambers, a quantity of fluent material in the receptacle flowable through said passageways from one chamber to the other, the inner walls of said chambers being shaped and the restricted passageways being of such size as to cause all the fluent material when contained in one chamber to flow at substantially the same rate through each of the two passageways into the other chamber by gravity when the ends of the chamber containing the fluent material are disposed in overlying relation to the ends of the other chamber.

2. A timer according to claim 1 wherein the receptacle is substantially annular in form and the means for adjustably mounting the receptacle is rotatable about the axis of the receptacle.

3. A timer according to claim 1 wherein the chambers and the passageways provide a closed path.

4. A timer according to claim 1 wherein each of the chambers is substantially semi-circular in form and the passageways connecting the ends of the chambers will be disposed on a horizontal line when the chambers are in superposed relation.

5. A timer according to claim 4 wherein each of the chambers is substantially semi-annular in form.

6. A timer comprising a fixable member having a surface representation of an animated object having an open mouth, a hollow member formed with two like arcuate chambers connected at their ends mounted rearwardly of the surface representation means for rotatably mounting the hollow member to position the chambers thereof in overlying relation one to the other whereby one chamber will occupy a position in registry with the open mouth of the animated object to be visible therein, restricted passages connecting the adjacent ends of the arcuate chambers, a quantity of fluent material no greater than the volumetric capacity of one chamber and flowable from one chamber to the other chamber at substantially the same rate through each of the restricted passages under the action of gravity when the ends of the chamber containing the fluent material is disposed in overying relation to the ends of the other chamber and means for selectively positioning one chamber in overlying relation to the other.

7. A timer according to claim 6 wherein means comprising a spring-activated detent device are provided for releasably holding one chamber in overlying relation to the other chamber.

8. A timer according to claim 6 wherein the connected arcuate chambers are tubular in form and provide with the restrictive passages an annulus, and the restricted passages are at substantially the ends of the horizontal diameter of said annulus when the chambers are in superposed relation.

9. A timer according to claim 6 wherein the surface representation of the animated object is an animal having a knob-like nose comprising the means for rotatably positioning one member in overlying relation to the other.

10. A timer according to claim 6 wherein the chamber of the hollow member visible in the open mouth of the animated object has a curvature substantially parallel to the lower edge of said open mouth, and the fluent material in said hollow member is of a color contrasting to that of said open mouth.

References Cited in the file of this patent

UNITED STATES PATENTS

| 441,661 | Hawley | Dec. 2, 1890 |
| 1,002,227 | Corson | Sept. 5, 1911 |

FOREIGN PATENTS

| 328,367 | France | Jan. 8, 1903 |